Patented July 6, 1937

2,085,858

UNITED STATES PATENT OFFICE 2,085,858

HEAVY METAL COMPOUNDS OF A THIOBARBITURIC ACID AND PROCESS OF MAKING THE SAME

Heinrich Jung, Wuppertal-Vohwinkel, and Hans Andersag, Wuppertal-Elberfeld, Germany, assignors to Winthrop Chemical Company, Inc., New York, N. Y., a corporation of New York No Drawing. Application November 29, 1933, Serial No. 700,353. In Germany December 3, 1932

6 Claims. (Cl. 260—11)

This invention relates to neutral water-soluble complex compounds of heavy metals with thiopyrimidine derivatives containing a group capable of forming neutral salts, and to a process of preparing the same.

Metal complex compounds of mercapto pyrimidines have already been prepared. The known compounds, for instance, those derived from hydroxy-mercapto-pyrimidines have the disadvantage that they are not stable or do not dissolve in water. The solubility in water of heavy metal complex compounds is, however, mostly of decisive importance as to their usefulness in therapy, for instance, as to the suitability of such heavy metal complex compounds for injection purposes.

In accordance with the present invention neutral water-soluble complex salts of heavy metals, particularly of mercury, copper, silver and gold are obtainable by reacting upon a water-soluble mercapto-pyrimidine derivative containing a group capable of forming neutral salts with a water-soluble heavy metal salt in the presence of water and neutralizing the reaction mixture, if necessary, by the addition of acids or bases. Mercapto-pyrimidine derivatives of the kind specified are mercapto-pyrimidines which contain basic or acid substituents capable of forming neutral salts with acids or bases, for instance, thiobarbituric acid derivatives of the formula:

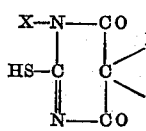

wherein X stands for hydrogen or an organic radical, such as alkyl, phenyl and their substitution products, and Y stands for an acid group capable of forming neutral salts, for instance, the carboxylic group, or fatty acid radicals, such as the acetic and propionic acid radical, or for a basic group capable of forming neutral salts, for instance, amine radicals containing nitrogen in aliphatic linkage, as, for instance, in the aminoalkyl or alkylaminoalkyl radicals.

Other representatives of the mercapto-pyrimidines suitable in the present invention as complex forming component are, for instance, the derivatives of thiouracil of the formula:

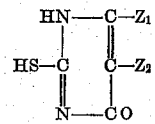

wherein $Z_1$ and $Z_2$ stand for substituents, one at least being an acid or basic radical capable of forming neutral salts, the other may be hydrogen, alkyl or the like.

In the new complex compounds the heavy metal is probably attached to a sulfur atom of the sulfhydryl group of the starting material. The metal complex compounds containing a mercapto-pyrimidine with an acid salt-forming group are neutralized preferably by means of an alkali metal or amine base, those containing a basic salt-forming group are neutralized by means of mineral acids, such as hydrochloric acid and sulfuric acid, or by means of organic acids, such as acetic, lactic and citric acid. In the case the pyrimidine nucleus is in itself acid in character and contains a basic substituent also an inner salt formation may take place, for instance, the water-soluble silver-diethylaminoethyl-barbituric acid is probably an inner salt of the following formula:

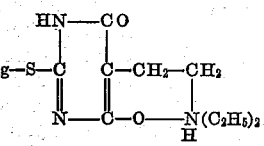

The complex forming pyrimidine derivatives used as starting materials are obtainable in the manner known per se.

The neutral water-soluble complex compounds thus obtainable are whitish or weakly colored powders. They are distinguished by a relatively good stability. They can be used for the treatment of infectious diseases, particularly in the form of injection solutions.

The invention is further illustrated by the following examples but it is not limited thereto:—

*Example 1.*—2.4 parts by weight of thiobarbituryl acetic acid and 1.1 parts by weight of sodium bisulfite are dissolved in a mixture of 40 parts by weight of water and 10 parts by weight of 5 normal aqueous caustic soda solution. The mixture is then treated with a solution of 4 parts by weight of gold potassium chloride in 15 parts by weight of water while stirring. The precipitate of aurothiobarbituryl acetic acid formed is filtered with suction, dissolved in normal aqueous caustic soda solution, and the mixture is poured into methyl alcohol while stirring, whereupon the sodium salt precipitates. A light yellow powder is thus obtained which is readily soluble in water. It has probably the formula:—

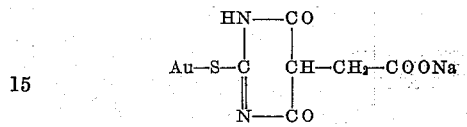

Example 2.—2.4 parts by weight of thiobarbituryl acetic acid are dissolved in 30 parts by weight of water and 4 parts by weight of 5 normal aqueous caustic soda solution. The mixture is treated with a solution of 1.7 parts by weight of silver nitrate in 10 parts by weight of water while stirring and, after the addition of 2 parts by weight of dilute acetic acid and 50 parts by weight of methyl alcohol, filtered with suction. The silver thiobarbituryl acetic acid thus formed is dissolved by means of bases and the salt is precipitated by pouring the solution into alcohol or other organic solvents miscible with water, while stirring. After sucking off and drying, for instance, the sodium salt is obtained as a white powder.

Example 3.—3 parts by weight of N-phenyl-diethylaminoethyl-thiobarbituric acid are dissolved in 14 parts by weight of normal aqueous caustic soda solution and 15 parts by weight of water. The mixture is then treated with a solution of 1.7 parts by weight of silver nitrate in 10 parts by weight of water. On cautiously acidifying with dilute acetic acid the silver-N-phenyl-diethylaminoethyl-thiobarbituric acid separates as a white precipitate. The compound is dissolved in the calculated quantity of dilute acetic acid and the water-soluble acetic acid salt is separated, for instance, by evaporation. It has probably the formula:

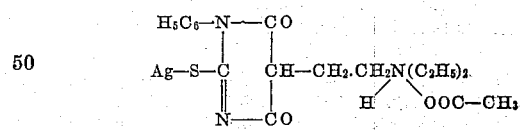

Example 4.—2.9 parts by weight of N-allyl-diethylaminoethyl-thiobarbituric acid are mixed with a solution of 1.7 parts by weight of silver nitrate in 5 parts by weight of water. After solution has taken place the mixture is treated with concentrated ammonia whereupon the silver-N-allyl-diethylaminoethyl-thiobarbituric acid which is soluble in water on account of its inner salt formation crystallizes out. A whitish crystal powder which is soluble in alkali lyes and acids is thus obtained. It has probably the formula:

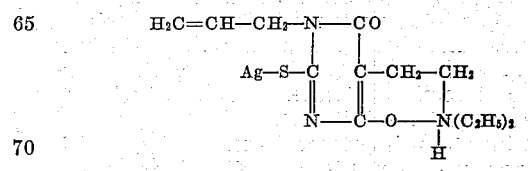

An analogous product is obtained when starting with N-allyl-diethylaminomethyl- or N-methyl-diisoamyl-aminoethyl-thiobarbituric acid.

Example 5.—2.7 parts by weight of diallylamino-ethyl-thiobarbituric acid are dissolved in 20 parts by weight of a normal aqueous caustic soda solution. The mixture is treated with a solution of 1.7 parts by weight of silver nitrate in 5 parts by weight of water. The precipitate separating is dissolved while stirring. The silver-diallylaminoethyl-thiobarbituric acid forming a white crystal powder is liberated by means of 10 parts by weight of normal acetic acid, filtered with suction, washed with acetone and ether and dried. The base thus obtained is dissolved in the calculated quantity of dilute acetic acid and the solution is evaporated in vacuo.

Example 6.—3 parts by weight of diethylaminoethyl-thiobarbituric acid and 1.1 parts by weight of sodium bisulfite are dissolved in a mixture of 6 parts by weight of a normal aqueous caustic soda solution and 30 parts by weight of water. The mixture is treated with a solution of 4 parts by weight of gold potassium chloride in 10 parts by weight of water while stirring and cautiously acidified with dilute hydrochloric acid, whereupon the hydrochloride separates. The product obtained is a whitish crystal powder which is soluble in water.

Example 7.—2.5 parts by weight of diethyl-aminoethyl-thiobarbituric acid and 1.1 parts by weight of sodium bisulfite are dissolved in a mixture of 6 parts by weight of a normal aqueous caustic soda solution and 15 parts by weight of water. The mixture is treated with a solution of 1.7 parts by weight of crystallized copper chloride in 5 parts by weight of water while stirring. On cautiously treating the mixture the copper-diethylamino-ethyl-thiobarbituric acid separates as a white crystalline precipitate. On account of the inner salt formation the complex compound dissolves in water.

When using aminohydroxypropyl-thiobarbituric acid as the complex forming compound, an analogous complex compound is obtained.

Example 8.—12 parts by weight of diethylaminoethyl-thiobarbituric acid are dissolved in 50 parts by weight of a normal aqueous caustic soda solution and 50 parts by weight of water. The mixture is treated with a solution of 8.5 parts by weight of silver nitrate in 30 parts by weight of water while stirring. On standing the silver-diethylaminoethyl-thiobarbituric acid separates in whitish crystals which on account of their inner salt formation are soluble in water.

Example 9.—4.8 parts by weight of thiobarbituryl acetic acid are dissolved in 20 parts by weight of a normal aqueous caustic soda solution. The mixture is treated with 1.7 parts by weight of copper-chloride-hydrate in 10 parts by weight of water. After standing for a short time the copper-thiobarbituryl acetic acid separates as a sandy precipitate. The mixture is neutralized by means of a 5-normal aqueous caustic soda solution. The sodium salt thus formed is separated by pouring the solution into alcohol while stirring.

Example 10.—4.1 parts by weight of N-phenoxyphenyl-diethylaminoethyl-thiobarbituric acid are dissolved in 40 parts by weight of a normal aqueous caustic soda solution and 40 parts by weight of water. The mixture is treated with a solution of 1.7 parts by weight of silver nitrate in 10 parts by weight of water. As soon as solution has taken place the mixture is filtered, acidified with acetic acid and rendered alkaline by means of ammonia. The silver-N-phenoxyphenyl-diethylaminoethyl-thiobarbituric acid precipitates as a white grey powder. The base is dissolved in the calculated quantity of dilute acetic acid and the solution is evaporated.

*Example 11.*—2.1 parts by weight of methylthiouracil acetic acid are dissolved in 20 parts by weight of a normal aqueous caustic soda solution. The mixture is treated with a solution of 1.7 parts by weight of silver nitrate in 5 parts by weight of water and the reaction mixture is poured into alcohol while stirring. The sodium salt of silver-methylthiouracil acetic acid thus formed is a white powder which is soluble in water. It has probably the formula:

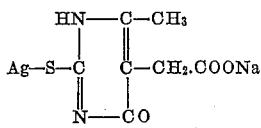

An analogous complex salt is obtained when using thiouracil carboxylic acid of the formula:

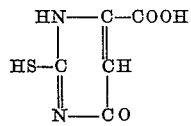

as the complex forming component.

*Example 12.*—4.1 parts by weight of thiobarbituryl acetic acid amide, 1.7 parts by weight of copper-chloride-hydrate and 30 parts by weight of 20% hydrochloric acid are concentrated on the water bath to about ⅓ their volume, diluted with water and sucked off. The copper-thiobarbituryl acetic acid formed is a light yellow sandy powder. It is neutralized with a 5-normal aqueous caustic soda solution and the solution is poured into alcohol while stirring. The sodium salt precipitates as a light yellow powder which is soluble in water.

*Example 13.*—4 parts by weight of thiobarbituryl acetic acid amide, 1.7 parts by weight of copper-chloride-hydrate and 10 parts by weight of water are mixed together whereupon copper-thiobarbituric acetic acid amide is formed. After the addition of 30 ccs. of 20% hydrochloric acid the solution is evaporated to ⅓ its volume, whereupon copper-thiobarbituryl acetic acid is formed. The latter is converted into its water-soluble sodium salt according to the directions given in Example 12.

*Example 14.*—Into a solution of 12.1 grams of diethylaminoethyl-thiobarbituric acid in 50 ccs. of normal aqueous caustic soda solution a solution of 6.8 grams of mercury chloride in 150 ccs. of water is poured while stirring. A clear solution is obtained from which on the addition of alkalies no mercury is separated. By the addition of dilute sulfuric acid the sulfate of mercury-diethylaminoethyl-thiobarbituric acid is obtained in the form of glittering rhombic leaflets. The compound may be recrystallized from hot water.

We claim:—

1. Neutral, water-soluble complex compounds of a heavy metal selected from the group consisting of mercury, copper, silver and gold with a thiobarbituric acid substituted in the 5-position by an alkylaminoalkyl group, which metal complex compounds are suitable for therapeutic purposes.

2. Neutral, water-soluble complex compounds of a heavy metal selected from the group consisting of mercury, copper, silver and gold with a thiobarbituric acid substituted in the 5-position by a dialkylamino-alkyl group, which metal complex compounds are suitable for therapeutic purposes.

3. A neutral, water-soluble silver complex compound of N-allyl-5-diethylaminoethyl-thiobarbituric acid, which metal complex compound is suitable for therapeutic purposes.

4. The process which comprises reacting upon a water-soluble thiobarbituric acid substituted in the 5-position by an alkylaminoalkyl group, with a water-soluble salt of a heavy metal selected from the group consisting of mercury, copper, silver and gold in the presence of water, and neutralizing the reaction mixture.

5. The process which comprises reacting upon a water-soluble 5-dialkylaminoalkyl-thiobarbituric acid with a water-soluble salt of a heavy metal selected from the group consisting of mercury, copper, silver and gold in the presence of water, and neutralizing the reaction mixture.

6. The process which comprises reacting upon N-allyl-5-diethylaminoethyl-thiobarbituric acid with silver nitrate in the presence of water and precipitating the complex compound formed by the addition of concentrated ammonia.

HEINRICH JUNG.
HANS ANDERSAG.